United States Patent
Navratil et al.

(10) Patent No.: US 10,533,867 B2
(45) Date of Patent: *Jan. 14, 2020

(54) PROCESSING SYSTEM HAVING A MACHINE LEARNING ENGINE FOR PROVIDING A COMMON TRIP FORMAT (CTF) OUTPUT

(71) Applicant: Allstate Insurance Company, Northbrook, IL (US)

(72) Inventors: Zoran Navratil, Arlington Heights, IL (US); Kevin Patrick Rice, Libertyville, IL (US); Daniel Brian Mohnen, Grayslake, IL (US); Kevin Glickley, Lake Villa, IL (US); Nilesh Ponnala, Naperville, IL (US); Rahul Chandrawanshi, Glenview, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,666

(22) Filed: Oct. 17, 2018

(65) Prior Publication Data
US 2019/0310095 A1  Oct. 10, 2019

Related U.S. Application Data

(63) Continuation of application No. 15/948,442, filed on Apr. 9, 2018.

(51) Int. Cl.
*G06Q 40/08* (2012.01)
*G01C 21/34* (2006.01)
(Continued)

(52) U.S. Cl.
CPC ... *G01C 21/3484* (2013.01); *G06Q 10/06393* (2013.01); *G06Q 40/08* (2013.01); *G07C 5/008* (2013.01); *H04W 4/44* (2018.02)

(58) Field of Classification Search
CPC ... G01C 21/3484; H04W 4/44; G06Q 10/063; G06Q 10/0635; G06Q 10/0639; G06Q 10/06393; G06Q 40/08
(Continued)

(56) References Cited

U.S. PATENT DOCUMENTS 6,691,116 B1  2/2004  Bart
8,706,348 B2  4/2014  Beams et al.
(Continued)

FOREIGN PATENT DOCUMENTS

WO  2018005834 A1  1/2018

OTHER PUBLICATIONS

Cloudera, Powering the Internet of Things with Apache Hadoop: Four Customer Use Cases, 2016 (Year: 2016).*
Intel, Intel and Cloudera Use Telematics and Analytics to Personalize Auto Insurance Coverage, 2015 (Year: 2015).*
Mills, Driving Motor Insurance Ahead with Telematics, May 28, 2013, IBM Big Data & Analytics Hub Blog (https://www.ibmbigdatahub.com/blog/driving-motor-insurance-ahead-telematics) (Year: 2013).*
(Continued)

*Primary Examiner* — Nadeem Odeh
(74) *Attorney, Agent, or Firm* — Banner & Witcoff, Ltd.

(57) ABSTRACT

Aspects of the disclosure relate to enhanced telematics processing systems with improved third party source data integration features and enhanced customized driving output determinations. A computing platform may receive telematics data and third party source data. The computing platform may enrich the telematics data using the third party source data. After generating the enriched telematics data, the computing platform may use machine learning algorithms and datasets to validate the enriched telematics data. The computing platform may ingest, via a batch ingestion process, the enriched telematics data. For example, the computing platform may store the enriched telematics data and generate additional enriched telematics data until expiration of a predetermined period of time. The computing platform may ingest the enriched telematics data associated with each trip. Once the enriched telematics data has been
(Continued)

ingested, the computing platform may generate a standardized common trip format output for each trip.

17 Claims, 13 Drawing Sheets

(51) Int. Cl.
*G07C 5/00* (2006.01)
*H04W 4/44* (2018.01)
*G06Q 10/06* (2012.01)

(58) Field of Classification Search
USPC .............................................. 701/424; 705/4
See application file for complete search history.

(56) References Cited

U.S. PATENT DOCUMENTS

| | | | |
|---|---|---|---|
| 9,070,176 | B2 | 6/2015 | Pearcy et al. |
| 9,472,030 | B2 | 10/2016 | Davidson et al. |
| 9,749,430 | B2 | 8/2017 | Nano et al. |
| 2004/0004964 | A1 | 1/2004 | Lakshmanamurthy et al. |
| 2006/0047379 | A1 | 3/2006 | Schullian et al. |
| 2010/0179849 | A1 | 7/2010 | Muckell et al. |
| 2012/0316726 | A1 | 12/2012 | Schroeck et al. |
| 2013/0275363 | A1 | 10/2013 | Wu et al. |
| 2014/0095211 | A1 | 4/2014 | Gloerstad et al. |
| 2014/0222321 | A1 | 8/2014 | Petty et al. |
| 2015/0241242 | A1 | 8/2015 | Rings |
| 2016/0004578 | A1 | 1/2016 | Selig, IV et al. |
| 2016/0299957 | A1 | 10/2016 | A. C. et al. |
| 2017/0006135 | A1 | 1/2017 | Siebel et al. |
| 2017/0060622 | A1 | 3/2017 | Haughwout et al. |
| 2017/0124660 | A1 | 5/2017 | Srivastava |

OTHER PUBLICATIONS

IBM I, Telematics Insurance, Sep. 2012, IBM Gloabl Business Services White Paper (Year: 2012).*
IBM II, Telematics for Insurance, Sep. 2014, IBM Software White Paper (Year: 2014).*
Walker, Batch vs. Real Time Data Processing, Aug. 13, 2013, Data Science Central website (https://www.datasciencecentral.com/profiles/blogs/batch-vs-real-time-data-processing) (Year: 2013).*
Hendrik Schweppe et al. "Flexible On-Board Stream Processing for Automotive Sensor Data" IEEE Transactions on Industrial Informatics http://www.eurecom.fr/en/publication/2998/download/rs-publi-2998_1.pdf website visited Mar. 29, 2018, pp. 1-12.
"LHP Telematics Mixed Fleet Data Broker" https://lhptelematics.com/Mixed-Fleet-Solutions website visited Feb. 12, 2018, 1 page.
Dan Pikelny et al. "Navistar" https://www.constellationr.com/node/6292/vote/application/view/357 website visited Mar. 29, 2018, pp. 1-3.
BMC Customer Navistar "Big Trucks Deliver Big Data at Navistar" https://www.bmc.com/blogs/big-trucks-deliver-big-data-navistar/ Aug. 24, 2016, pp. 1-3.
"Fleet Data Science—Fleet Data Analytics—Fleet Telematics" https://www.azuga.com/products/data-science/website visited Feb. 12, 2018, pp. 1-3.
John Huetter "Azuga Partners with CCC to help Insurers with Crash Analysis, FNOL and Claims Automation" https://www.azuga.com/azuga-partners-ccc-help-insurers-crash-analysis-claims-automation/ Dec. 12, 2017, pp. 1-3.
Jul. 1, 2019—(WO) Search Report & Written Opinion—App PCT/US19/024865.

* cited by examiner

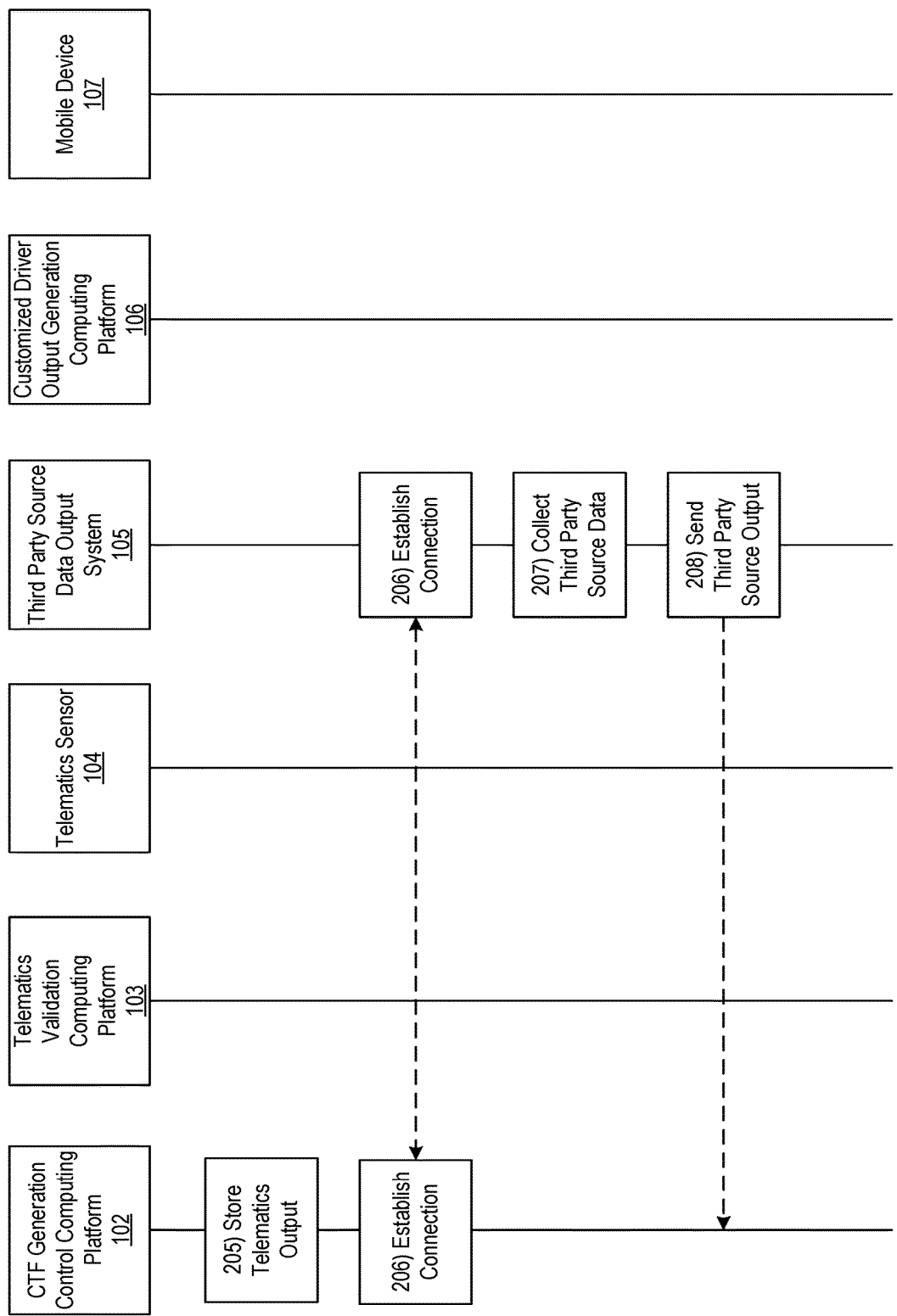

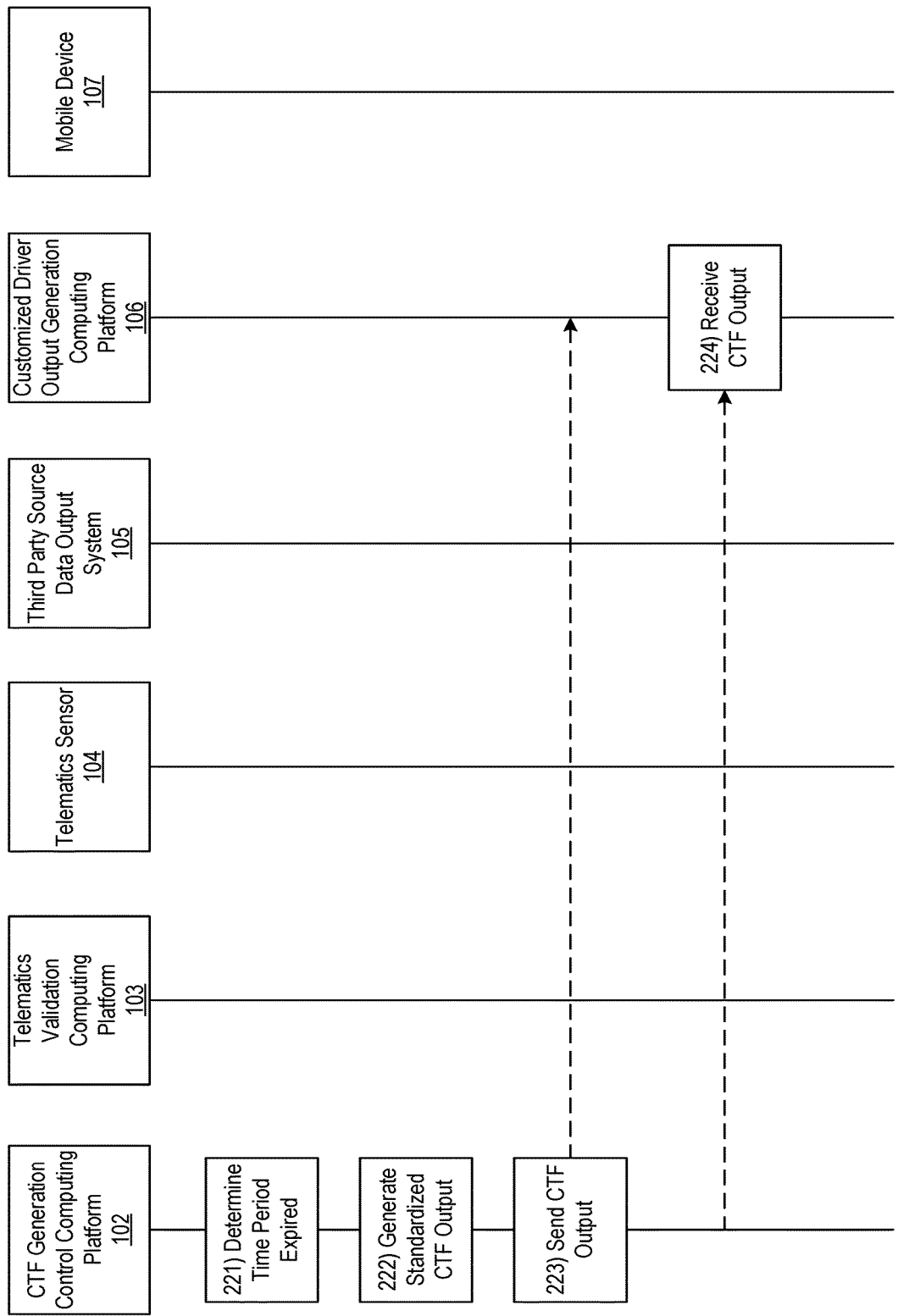

PROCESSING SYSTEM HAVING A MACHINE LEARNING ENGINE FOR PROVIDING A COMMON TRIP FORMAT (CTF) OUTPUT

CROSS-REFERENCE TO RELATED CASES

This application is a continuation of co-pending U.S. application Ser. No. 15/948,442, entitled PROCESSING SYSTEM HAVING A MACHINE LEARNING ENGINE FOR PROVIDING A COMMON TRIP FORMAT (CTF) OUTPUT, filed on Apr. 9, 2018, the contents of which are incorporated herein by reference in its entirety for all purposes.

BACKGROUND

Aspects of the disclosure relate to enhanced telematics processing systems with improved third party source data integration features and enhanced customized driving output determinations. In particular, one or more aspects of the disclosure relate to telematics processing systems that utilize telematics data and third party source data associated with a driving trip to improve driving data compatibility and to facilitate customized driver output determinations.

Because many organizations and individuals rely on telematics data as a method for determining customized driver outputs, enhancing the telematics data with third party source data is important. In many instances, however, it may be difficult to associate the third party source data with telematics data in a standardized format while also ensuring that accuracy of the customized driver output determinations is maintained.

SUMMARY

Aspects of the disclosure provide effective, efficient, scalable, and convenient technical solutions that address and overcome the technical problems associated with optimizing the performance of common trip format generation control computing platforms and customized driver output generation computing platforms, along with the information that such systems may maintain, using enhanced common trip format generation and customized driver output generation techniques.

In accordance with one or more arrangements discussed herein, a computing platform having at least one processor, a communication interface, and memory may establish a connection between the computing platform and a plurality of telematics sensors via the communication interface. The computing platform may receive, from the plurality of telematics sensors and via the communication interface, telematics output data. The computing platform may establish a connection between the computing platform and a plurality of third party sources via the communication interface. In addition, the computing platform may receive, from the plurality of third party sources and via the communication interface, third party source data. The computing platform may generate an enriched telematics output by combining the telematics output data and the third party source data. In some examples, the computing platform may validate the enriched telematics output based on one or more machine learning datasets. The computing platform may determine a mode of ingestion for ingesting the validated enriched telematics output. The computing platform may generate a standardized common trip format (CTF) output based on the validated enriched telematics output and the determined mode of ingestion.

In some arrangements, the computing platform may generate one or more commands directing a telematics output validation computing platform to validate the enriched telematics output. The computing platform may transmit, to the telematics output validation computing platform and via the communication interface, the one or more commands directing the telematics output validation computing platform to validate the enriched telematics output. The computing platform may receive, from the telematics output validation computing platform and via the communication interface, an enriched telematics output confirmation comprising an indication that the enriched telematics output has been validated.

In some examples, the computing platform may validate the enriched telematics output by receiving the enriched telematics output confirmation.

In some arrangements, the computing platform may determine, after the enriched telematics output has been validated, whether the enriched telematics output should be ingested in a streaming mode or a batch mode. In response to determining that the enriched telematics output should be ingested in the batch mode, the computing platform may determine that the enriched telematics output is associated with a first event. The computing platform may store, for a predetermined period of time, the enriched telematics output along with a machine learning dataset associated with the first event. In response to an expiration of the predetermined period of time, the computing platform may generate, based on enriched telematics outputs stored along with the machine learning dataset associated with the first event, the standardized CTF output.

In some examples, the first event may comprise a first driving trip.

In some arrangements, the computing platform may determine that the enriched telematics output comprises a high priority telematics output. In addition, the computing platform may determine that another enriched telematics output comprises a low priority telematics output. Prior to ingesting the other enriched telematics output, the computing platform may ingest, the enriched telematics output.

In some examples, after the enriched telematics output has been validated, the computing platform may determine whether the enriched telematics output should be ingested in a streaming mode or a batch mode. In response to determining that the enriched telematics output should be ingested in the streaming mode, the computing platform may generate, based on the enriched telematics output, the standardized CTF output.

In some arrangements, the computing platform may send, via the communication interface and to a customized driver output generation computing platform, the standardized CTF output. In addition, the computing platform may generate one or more commands directing the customized driver output generation computing platform to generate a customized driver output based on the standardized CTF output.

In some examples, the standardized CTF output may include a user identifier.

In some example arrangements, the computing platform may receive, from the plurality of telematics sensors and via the communication interface, second telematics output data. The computing platform may generate a second enriched telematics output by combining the second telematics output data and the third party source data. In addition, the computing platform may determine that the second enriched telematics output was not validated. The computing platform may determine that the second enriched telematics output should not be ingested.

In accordance with one or more examples, a computing platform comprising at least one processor, a communication interface, and a memory may receive, from a telematics validation computing platform and via the communication interface, an enriched telematics output confirmation comprising an indication that an enriched telematics output has been validated. After the enriched telematics output has been validated, the computing platform may determine whether the enriched telematics output should be ingested in a streaming mode or a batch mode. In response to determining that the enriched telematics output should be ingested in the batch mode, the computing platform may determine that the enriched telematics output is associated with a first event. The computing platform may store, for a predetermined period of time, the enriched telematics output along with a machine learning dataset associated with the first event. In response to an expiration of the predetermined period of time, the computing platform may generate, based on enriched telematics outputs stored along with the machine learning dataset associated with the first event, a standardized common trip format (CTF) output.

In some examples, the computing platform may generate one or more commands directing the telematics validation computing platform to validate the enriched telematics output. In addition, the computing platform may transmit, to the telematics validation computing platform and via the communication interface, the one or more commands directing the telematics validation computing platform to validate the enriched telematics output.

In some arrangements, the computing platform may send, to a customized driver output generation computing platform, the CTF output. The computing platform may generate one or more commands directing the customized driver output generation computing platform to generate a customized driver output. The computing platform may send, to the customized driver output generation computing platform, the one or more commands to generate the customized driver output.

In some examples, the telematics validation computing platform and the customized driver output generation computing platform may be integrated into the computing platform.

In some arrangements, the predetermined period of time may be configured by a user.

In some examples, the computing platform may determine a trip initiation location and a trip destination. In addition, the computing platform may determine, based on the trip initiation location and the trip destination, the predetermined period of time.

In some arrangements, the computing platform may determine, based on a predefined setting, that the enriched telematics output should be ingested in the batch mode, wherein the predefined setting is configurable by a user.

In accordance with one or more example arrangements discussed herein, a computing platform comprising a at least one processor, a communication interface, and memory may receive, from a plurality of sensor devices and via the communication interface, telematics output data and third party source data. The computing platform may validate, via machine learning algorithms and analysis, the telematics output data. The computing platform may generate, based on the telematics output data and the third party source data, enhanced telematics output data. In addition, the computing platform may ingest the enhanced telematics output data. The computing platform may ingest, for a predetermined period of time, additional enhanced telematics output data. In response to an expiration of the predetermined period of time, the computing platform may determine, based on the enhanced telematics output data and the additional enhanced telematics output data, a standardized common trip format (CTF) output.

In some examples, the standardized CTF output may comprise a JavaScript Object Notation (JSON) spreadsheet output containing the enhanced telematics output data and the additional enhanced telematics output data.

In some arrangements, the computing platform may send, to a customized driver output generation computing platform, the CTF output. The computing platform may generate one or more commands directing the customized driver output generation computing platform to generate a customized driver output. The computing platform may send, to the customized driver output generation computing platform, the one or more commands to generate the customized driver output.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for deploying a CTF generation control computing platform that utilizes improved customized driver output generation techniques in accordance with one or more example arrangements discussed herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

It may be difficult for organizations to determine how best to determine customized driver outputs based on telematics and source data from multiple sources. A standardized format for this information may facilitate combinations of this telematics and source data for purposes of determining the customized driver outputs. Once the data is validated, the telematics and source data may be stored for a predetermined amount of time prior to processing. This may allow the telematics and source data to be associated with a particular event or driving trip regardless of when the telematics and source data was actually received. Once the predetermined amount of time expires, a standardized common trip format (CTF) output may be generated based on the stored telematics and source data. The standardized CTF output may subsequently be used in the determination of customized driver outputs.

Figure 1A:
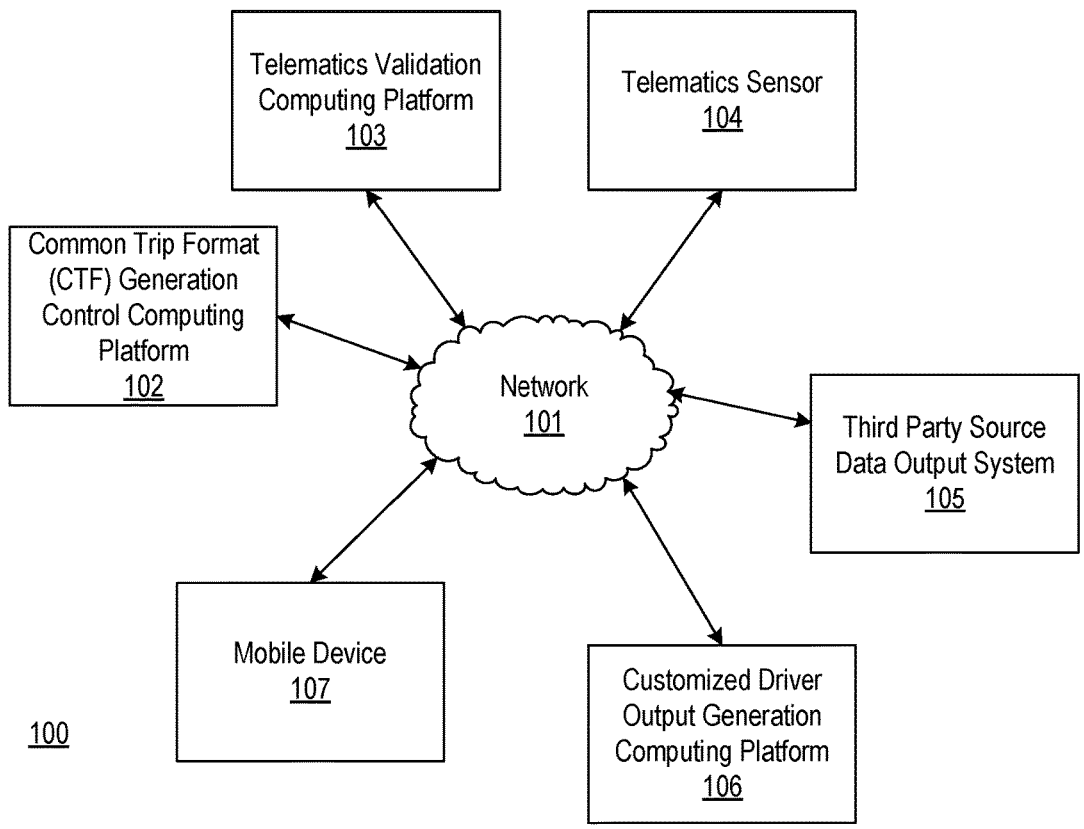
FIGS. 1A and 1B depict an illustrative computing environment for deploying a common trip format (CTF) generation control computing platform that utilizes improved customized driver output generation techniques in accordance with one or more example arrangements discussed herein.
Figure 1B:
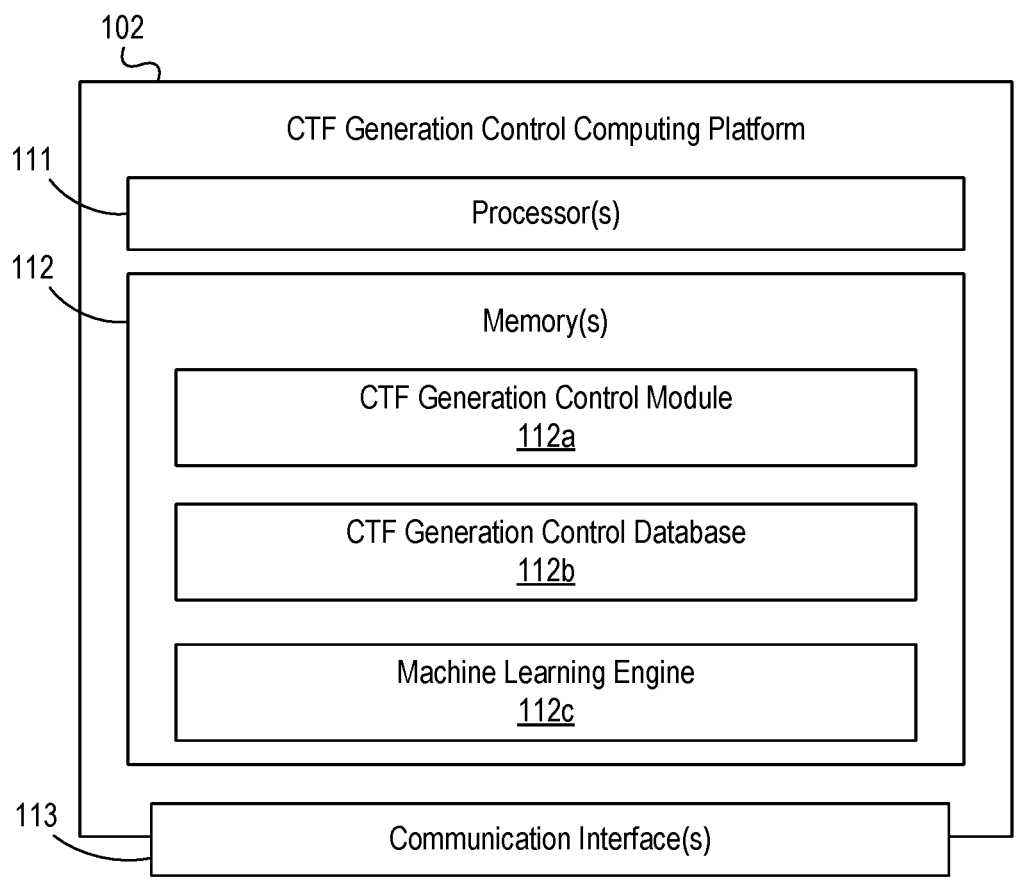

FIGS. 1A and 1B depict an illustrative computing environment for deploying a CTF generation control computing platform that utilizes improved customized driver output generation techniques in accordance with one or more example embodiments. Referring to FIG. 1A, computing environment 100 may include one or more computer systems. For example, computing environment 100 may include a common trip format (CTF) generation control computing platform 102, telematics validation computing platform 103, one or more telematics sensors 104, one or more third party source data output systems 105, a customized driver output generation computing platform 106, and one or more mobile devices 107.

As illustrated in greater detail below, CTF generation control computing platform 102 may include one or more computing devices configured to perform one or more of the functions described herein. For example, CTF generation control computing platform 102 may include one or more computers (e.g., laptop computers, desktop computers, servers, server blades, or the like) configured to enhance telematics outputs, ingest enhanced telematics outputs, and to generate standardized CTF outputs.

Telematics validation computing platform 103 may include one or more computing devices and/or other computer components (e.g., processors, memories, communication interfaces). In addition, and as illustrated in greater detail below, telematics validation computing platform 103 may be configured to generate, host, transmit, and/or otherwise provide one or more machine learning datasets. In some instances, machine learning datasets generated by telematics validation computing platform 103 may be associated with an internal portal provided by an organization, such as a claims processing or driver assistance portal. Such a portal may, for instance, provide customers and employees of the organization with access to customized driver outputs (e.g., driver scores, driving history, claims processing outputs, or the like). In addition, telematics validation computing platform 103 may be configured to receive requests (e.g., requests to validate a telematics output received from the telematics sensor 104 by the CTF generation control computing platform 102) from CTF generation control computing platform 102 and/or perform various functions with respect to such requests, as discussed in greater detail below. In some instances, telematics validation computing platform 103 may be integrated into the CTF generation control computing platform 102.

Telematics sensor 104 may comprise one or more computing devices and/or other computer components (e.g., processors, memories, communication interfaces). The telematics sensor 104 may comprise, for example, a global positioning system (GPS) sensor or another type of location sensor, an accelerometer, a speedometer, a compass, a gyroscope, or the like. In some examples, the telematics sensor 104 may be part of an on-board vehicle system. In other examples, the telematics sensor 104 may be integrated into a mobile device such as mobile device 107.

Third party source data output system 105 may comprise one or more computing devices and/or other computer components (e.g., processors, memories, communication interfaces). The third party source data output system 105 may comprise motion sensors (accelerometers, speedometers, compasses, gyroscopes, GPS receivers or the like), acoustic sensors (microphones or the like), vibration sensors (seismometers or the like), environmental sensors, temperature sensors (thermometers or the like), light sensors, or the like. The third party source data output system 105 may comprise certain sensors that may collect and analyze sensor data over time, for example, cameras, proximity sensors, and various wireless network interfaces capable of detect access to different data networks, mobile networks, and other mobile devices (e.g., via Bluetooth). The CTF generation control computing platform 102 may use the third party source data output system 105 to collect sensor data such as position, distance, speed, acceleration, orientation, speech, weather patterns, moisture, humidity, temperature, amount of light, and the like. The third party source data output system 105 may be integrated into a mobile device, such as the mobile device 107.

Customized driver output generation computing platform 106 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by customized driver output generation computing platform 106 may be associated with an internal portal provided by an organization, such as a claims processing or driving assistance portal. In addition, customized driver output generation computing platform 106 be configured to receive requests (e.g., requests to generate a customized driver output from the CTF generation control computing platform 102 and/or to cause output of the customizer driver output) from one or more remote computing devices and/or perform various functions with respect to such requests, as discussed in greater detail below. In some instances, customized driver output generation computing platform 106 may be integrated into the CTF generation control computing platform 102.

Mobile device 107 may be a user device such as a smartphone, personal digital assistant, or tablet computer, or the like. In some examples, the telematics sensor 104 and/or the third party source data output system 105 may be integrated into the mobile device 107.

In addition, and as illustrated in greater detail below, mobile device 107 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by mobile device 107 may be associated with an internal portal provided by an organization, such as a driver assistance portal as described above.

Computing environment 100 also may include one or more networks, which may interconnect one or more of CTF generation control computing platform 102, telematics validation computing platform 103, telematics sensor 104, third party source data output system 105, customized driver output generation computing platform 106, and mobile device 107. For example, computing environment 100 may include a network 101 (which may, e.g., interconnect CTF generation control computing platform 102, telematics validation computing platform 103, telematics sensor 104, third party source data output system 105, customized driver output generation computing platform 106, and mobile device 107).

In one or more arrangements, CTF generation control computing platform 102, telematics validation computing platform 103, telematics sensor 104, third party source data output system 105, customized driver output generation computing platform 106, mobile device 107, and/or the other systems included in computing environment 100 may be any type of computing device capable of receiving a user interface, receiving input via the user interface, and communicating the received input to one or more other computing devices. For example, CTF generation control computing platform 102, telematics validation computing platform 103, telematics sensor 104, third party source data output system 105, customized driver output generation computing platform 106, and mobile device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of CTF generation control computing platform 102, telematics validation computing platform 103, telematics sensor 104, third party source data output system 105, customized driver output generation computing platform 106, and mobile device 107 may, in some instances, be special-purpose computing devices configured to perform specific functions.

Referring to FIG. 1B, CTF generation control computing platform 102 may include one or more processors 111, memory 112, and communication interface 113. A data bus may interconnect processor 111, memory 112, and communication interface 113. Communication interface 113 may be a network interface configured to support communication between CTF generation control computing platform 102 and one or more networks (e.g., network 101, or the like). Memory 112 may include one or more program modules having instructions that when executed by processor 111 cause CTF generation control computing platform 102 to perform one or more functions described herein and/or one or more databases that may store and/or otherwise maintain information which may be used by such program modules and/or processor 111. In some instances, the one or more program modules and/or databases may be stored by and/or maintained in different memory units of CTF generation control computing platform 102 and/or by different computing devices that may form and/or otherwise make up CTF generation control computing platform 102. For example, memory 112 may have, store, and/or include a CTF generation control module 112$a$, a CTF generation control database 112$b$, and a machine learning engine 112$c$. CTF generation control module 112$a$ may have instructions that direct and/or cause CTF generation control computing platform 102 to execute advanced CTF generation techniques, as discussed in greater detail below. CTF generation control database 112$b$ may store information used by CTF generation control module 112$a$ and/or CTF generation control computing platform 102 in CTF generation control and/or in performing other functions. Machine learning engine 112$c$ may have instructions that direct and/or cause the CTF generation control computing platform 102 to perform CTF generation and to set, define, and/or iteratively refine optimization rules and/or other parameters used by the CTF generation control computing platform 102 and/or other systems in computing environment 100.

Figure 2A:
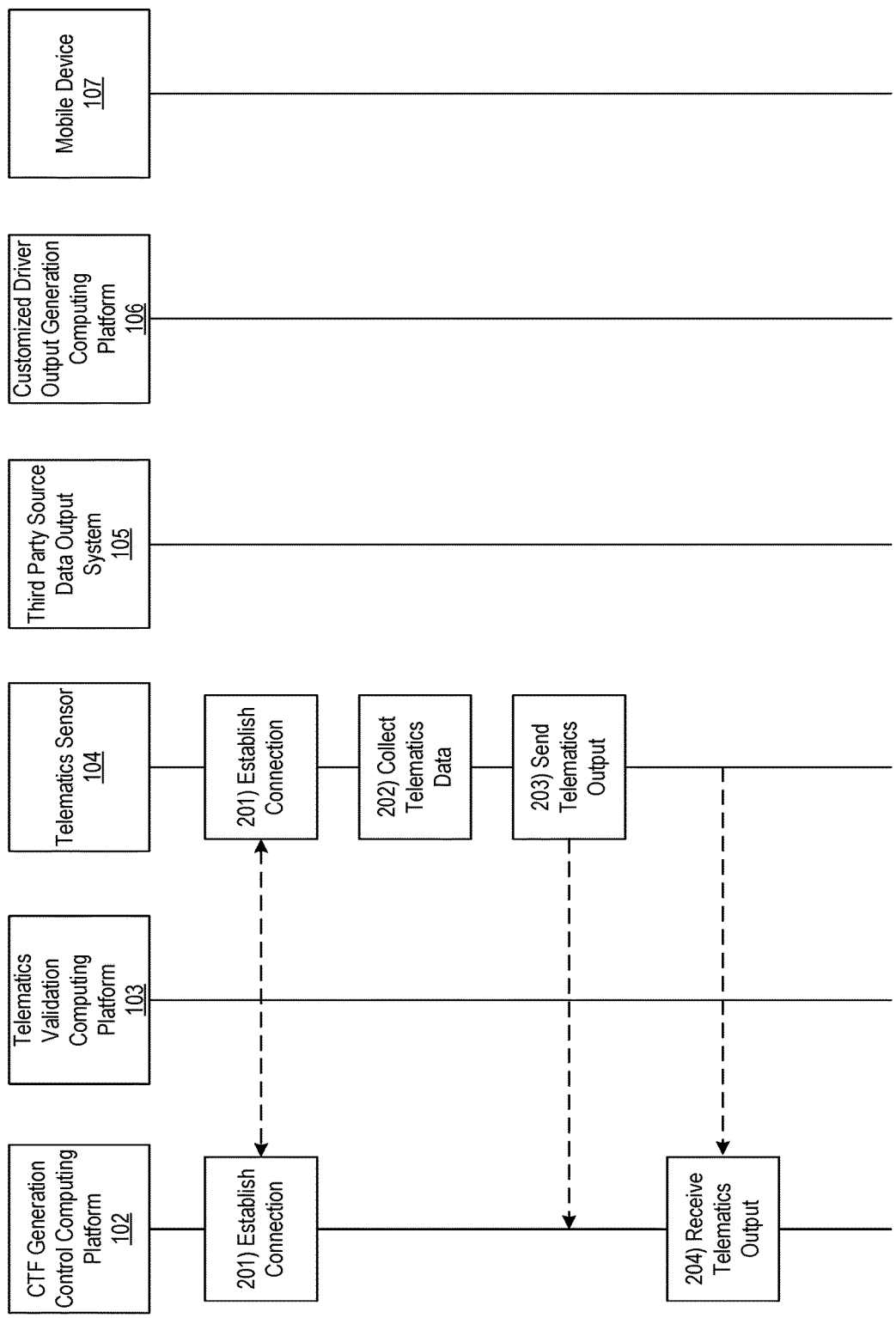

FIGS. 2A-2I depict an illustrative event sequence for deploying a CTF generation control computing platform that utilizes improved customized driver output generation techniques in accordance with one or more example embodiments. Referring to FIG. 2A, at step 201, CTF generation control computing platform 102 may establish a connection with one or more telematics sensors. For example, the CTF generation control computing platform 102 may establish a connection to telematics sensor 104. For example, the CTF generation control computing platform 102 may establish a first wireless data connection to the telematics sensor 104 to link the CTF generation control computing platform 102 to the telematics sensor 104. In some instances, the CTF generation control computing platform 102 may generate one or more commands directing the telematics sensor 104 to collect telematics data. While the first wireless data connection is established, the CTF generation control computing platform 102 may send, to the telematics sensor 104 and via the communication interface 113, the one or more commands.

At step 202, the telematics sensor 104 may collect telematics data. In some instances, the telematics sensor 104 may receive, from the CTF generation control computing platform 102 and via the first wireless data connection, one or more commands directing the telematics sensor 104 to collect telematics data. In these instances, the telematics sensor 104 may collect the telematics data in response to the one or more commands. In other instances, the telematics sensor 104 may not receive one or more commands from the CTF generation control computing platform 102, and may collect telematics data without being prompted to do so. In collecting the telematics data, the telematics sensor 104 may collect GPS data, speed data, acceleration data, orientation data, directional data, gyroscopic data, and the like associated with the telematics sensor 104.

At step 203, the telematics sensor 104 may send, to the CTF generation control computing platform 102, a telematics output comprising the telematics data collected at step 202. For example, the telematics sensor 104 may send, via the first wireless data connection and to the CTF generation control computing platform 102, the telematics output. In some instances, in sending the telematics output, the telematics sensor 104 may send data that has not been standardized. One or more telematics outputs may be sent, to the CTF generation control computing platform 102, from different telematics sensors.

At step 204, the CTF generation control computing platform 102 may receive, via the communication interface 113, via the first wireless data connection, and from one or more telematics sensors, such as the telematics sensor 104, the telematics output. For example, the CTF generation control computing platform 102 may receive, via the first wireless data connection and from the telematics sensor 104, the telematics output.

Referring to FIG. 2B, at step 205, CTF generation control computing platform 102 may store the telematics output received at step 204. For example, the CTF generation control computing platform 102 may store, in the memory 112, the telematics output. In some instances, the CTF generation control computing platform 102 may validate the telematics output prior to storing the telematics output. In these instances, if the telematics output is validated, the CTF generation control computing platform 102 may store the telematics output and if the telematics output is not validated the CTF generation control computing platform 102 may not store the telematics output. In additional instances, the CTF generation control computing platform 102 may determine that the telematics output is not validated and may store the telematics output for further processing or later use. In other instances, the CTF generation control computing platform 102 may store, prior to validation, the telematics output.

At step 206, CTF generation control computing platform 102 may establish a connection with a third party data source. For example, the CTF generation control computing platform 102 may establish a connection to third party source data output system 105. For example, the CTF generation control computing platform 102 may establish a second wireless data connection to the third party source data output system 105 to link the generation control computing platform 102 to the third party source data output system 105. In some instances, the CTF generation control computing control platform 102 may generate one or more commands directing the third party source data output system 105 to collect third party source data (e.g., accelerometer data, speedometer data, compass data, gyroscope data, GPS data, microphone data, seismometer data, environmental data, weather data, thermometer data, light data, vehicle type data, claim processing data, calendar data, time data, and the like). While the second wireless data connection is established, the CTF generation control computing platform 102 may send, to the third party source data output system 105 and via the communication interface 113, the one or more commands.

At step 207, the third party source data output system 105 may collect third party source data. In some instances, the third party source data output system, may receive, from the CTF generation control computing platform 102 and via the second wireless data connection, one or more commands directing third party source data output system 105 to collect third party source data. In these instances, the third party source data output system 105 may collect the third party source data in response to the one or more commands. In other instances, the third party source data output system 105 may not receive one or more commands from the CTF generation control computing platform 102, and may collect third party source data without being prompted to do so.

At step 208, the third party source data output system 105 may send, to the CTF generation control computing platform 102, a third party source output comprising the third party source data collected at step 207. For example, the third party source data output system 105 may send, via the second wireless data connection and to the CTF generation control computing platform 102, the third party source output. In some instances, in sending the third party source output, the third party source data output system 105 may send data that has not been standardized. One or more third party source outputs may be sent, to the CTF generation control computing platform 102, from different third party sources (such as the third party source data output system 105).

Figure 2C:
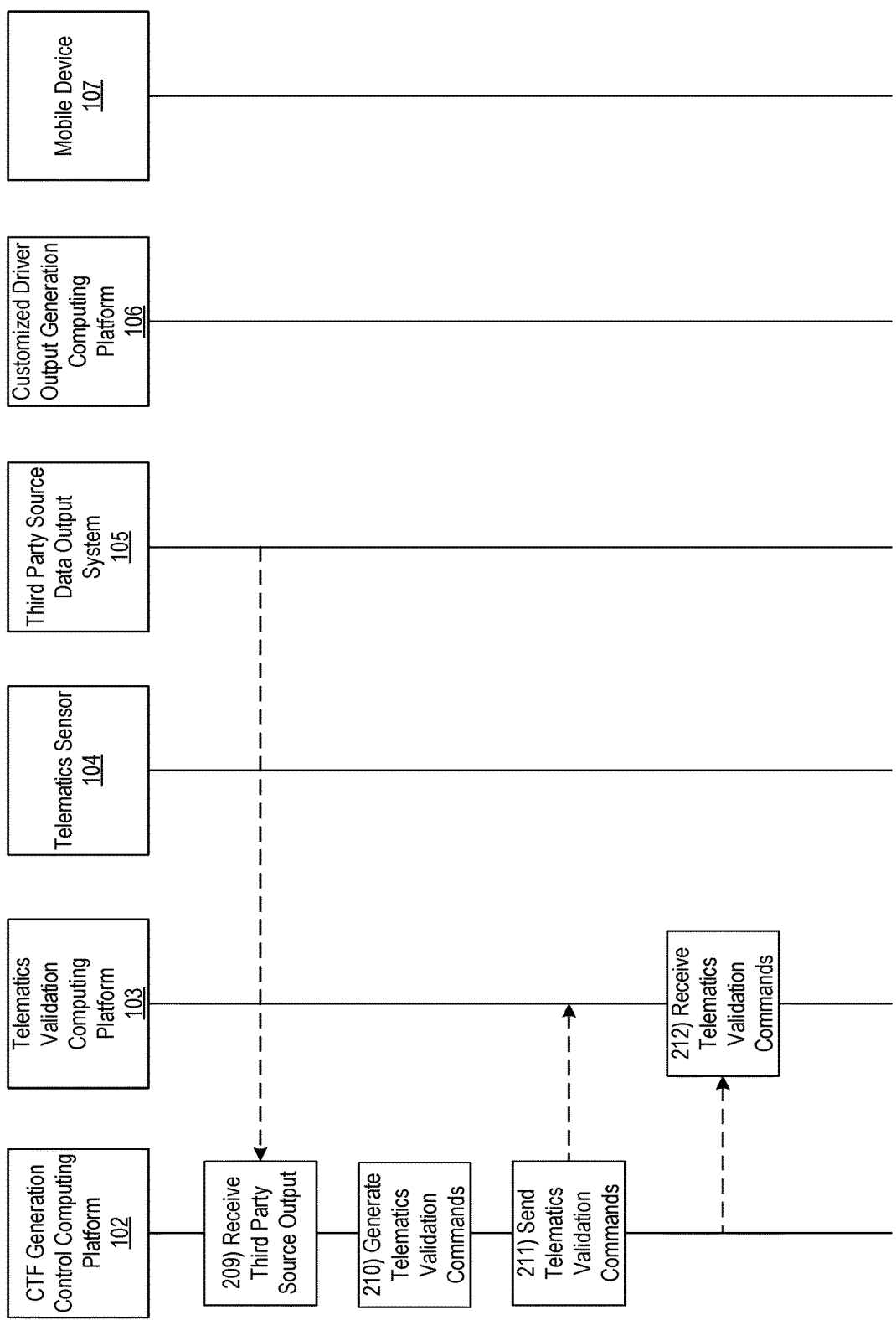

Referring to FIG. 2C, at step 209, the CTF generation control computing platform 102 may receive, via the communication interface 113, via the second wireless data connection, and from one or more third party sources, such as the third party source data output system 105, the third party source output. For example, the CTF generation control computing platform 102 may receive, via the first second data connection and from the third party source data output system 105, the third party source output.

At step 210, CTF generation control computing platform 102 may generate one or more telematics validation commands directing a telematics validation computing platform (such as telematics validation computing platform 103) to validate the telematics output. For example, the CTF generation control computing platform 102 may generate one or more commands to validate the telematics output received at step 204.

At step 211, the CTF generation control computing platform 102 may send the telematics validation commands to the telematics validation computing platform 103. The CTF generation control computing platform 102 may establish a connection with the telematics validation computing platform 103. For example, the CTF generation control computing platform 102 may establish a third wireless data connection to telematics validation computing platform 103. For example, the CTF generation control computing platform 102 may establish a third wireless data connection to the telematics validation computing platform 103 to link the CTF generation control computing platform 102 to the telematics validation computing platform 103. While the third wireless data connection is established, the CTF generation control computing platform 102 may send, via the communication interface 113, via the third wireless data connection, and to the telematics validation computing platform 103, the telematics validation commands. The CTF generation control computing platform 102 may send, along with the telematics validation commands, the telematics output.

At step 212, the telematics validation computing platform 103 may receive, from the CTF generation control computing platform 102 and via the third wireless data connection, the telematics validation commands and telematics output sent at step 211.

Figure 2D:
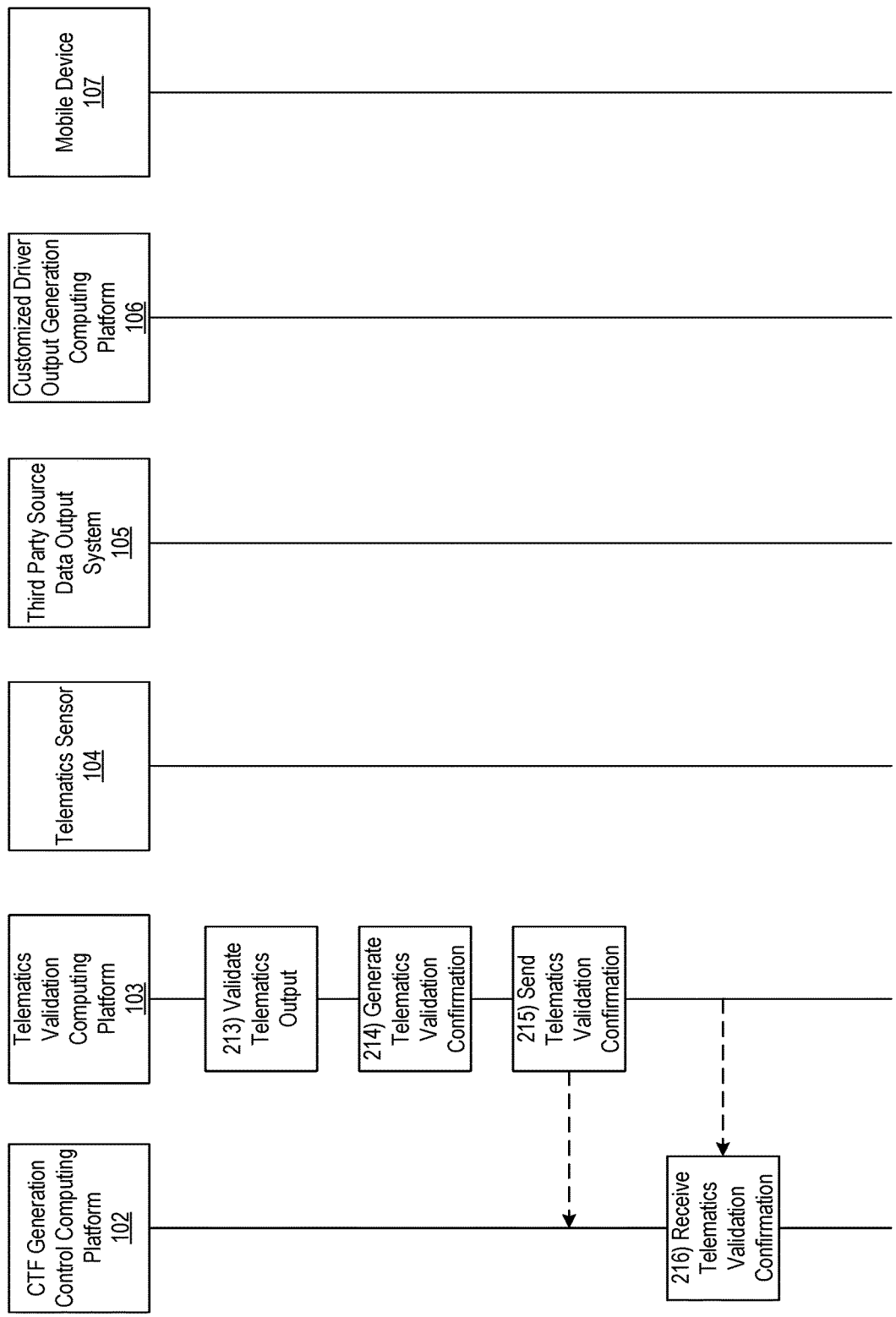

Referring to FIG. 2D, at step 213, the telematics validation computing platform 103 may validate the telematics output in response to the telematics validation commands received at step 212. For example, using machine learning analysis and algorithms, the telematics validation computing platform 103 may compare the telematics output to known route data, such as GPS coordinates along a proposed trip (e.g., determined using a route guidance program from a mobile device, and the like). Using the machine learning algorithms and analysis, the telematics validation computing platform 103 may generate a dataset of trip coordinates (e.g., latitudes, longitudes, and the like), and may compare the telematics output to the dataset. If the telematics validation computing platform 103 determines that the telematics output matches the dataset, the telematics validation computing platform may validate the telematics output. In some instances, the telematics validation computing platform 103 may determine that the telematics output matches the dataset to a degree that exceeds a predetermined correlation threshold. Based on the determination that the telematics output matches the dataset to a degree that exceeds the predetermined correlation threshold, the telematics validation computing platform 103 may validate the telematics output. If the telematics validation computing platform 103 determines that the telematics output does not match the dataset, the telematics validation computing platform 103 may not validate the telematics output. In some instances, the telematics validation computing platform 103 may determine that the telematics output is associated with a user who is inactive. In these instances, the telematics validation computing platform 103 may determine that the telematics output should not be validated. If the telematics output is not validated, the telematics validation computing platform 103 may store the telematics output for later processing and may send a notification to the CTF generation control computing platform 102 prompting it to return to step 204 to receive an updated telematics output. The telematics validation computing platform 103 may also generate an error code that may indicate why the telematics output was not validated. If the telematics output is validated, the telematics validation computing platform 103 may proceed to step 214.

In some instances, the CTF generation control computing platform may generate an enriched telematics output prior to validating the telematics output (e.g., step 217 may be performed prior to step 210). Generation of the enriched telematics output is described further below with regard to step 217. In these instances, the CTF generation control computing platform 102 may send, via the third wireless data connection, to the telematics validation computing platform 103, and along with the telematics validation commands, the enriched telematics output. In these instances, the telematics validation computing platform 103 may validate the enriched telematics output.

At step 214, the telematics validation computing platform 103 may generate a telematics validation confirmation. For example, in generating the telematics validation confirmation, the telematics validation computing platform 103 may generate an indication that the telematics output has been validated. In some instances, in generating the telematics validation confirmation, the telematics validation computing platform 103 may generate an indication that the enriched telematics output has been validated.

At step 215, the telematics validation computing platform 103 may send the telematics validation confirmation. For example, the telematics validation computing platform 103 may send, to the CTF generation control computing platform 102 and via the third wireless data connection, the telematics validation confirmation generated at step 214.

At step 216, the CTF generation control computing platform 102 may receive the telematics validation confirmation. For example, the CTF generation control computing platform 102 may receive, via the communication interface, via the third wireless data connection, and from the telematics validation computing platform 103, the telematics validation confirmation sent at step 215. In some instances, the telematics validation computing platform 103 may be integrated into the CTF generation control computing platform 102. In these instances, steps 211, 212, 215, and 216 may not be performed, and steps 213 and 214 may be performed by the CTF generation control computing platform 102.

Figure 2E:
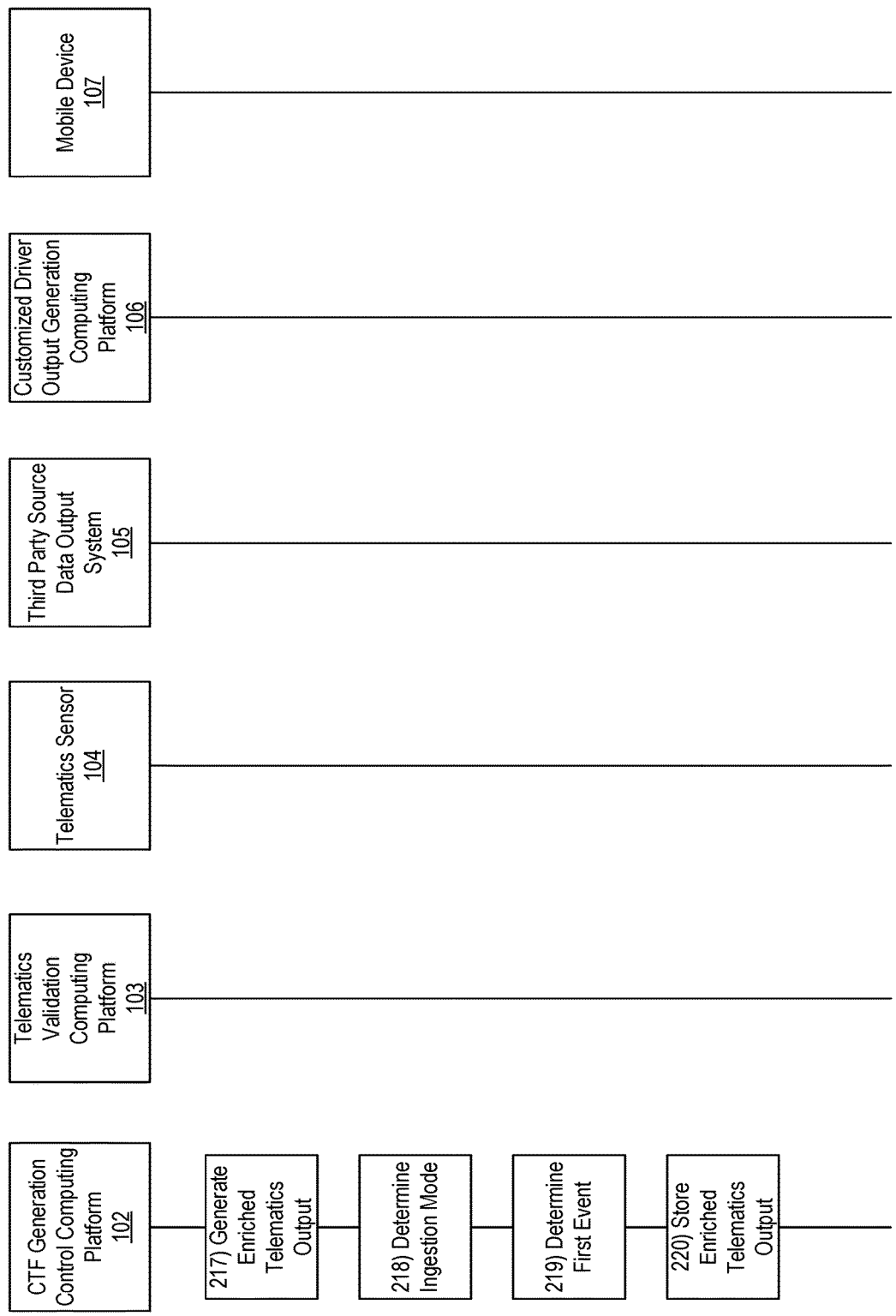

Referring to FIG. 2E, at step 217, if an enriched telematics output was not previously generated, the CTF generation control computing platform 102 may generate an enriched telematics output. For example, the CTF generation control computing platform 102 may generate the enriched telematics output by combining the telematics output received at step 204 and the third party source output received at step 209. As an example, the CTF generation control computing platform 102 may combine third party source data such as weather information, acceleration information, point of interest information, time data, date data, and the like with a particular location. For example, the enriched telematics output may indicate that a driver, while at a particular latitude and longitude, was braking during a rainstorm at 12:00 PM on Mar. 12, 2018 as he or she approached an elementary school.

In some instances, the CTF generation control computing platform 102 may generate the enriched telematics output based, at least in part, on machine learning algorithms and datasets. For example, although the third party source data may not indicate that the driver is approaching an elementary school, a machine learning dataset associated with the particular latitude and longitude may indicate that an elementary school is 100 yards in front of the driver and to the right. The machine learning datasets may be generated based on previously received telematics outputs and third party source outputs. For example, each machine learning dataset may be associated with a particular trip. As trips are repeated, each machine learning dataset may be supplemented with new third party source data.

At step 218, once the enriched telematics output is determined at step 217, the CTF generation control computing platform 102 may determine an ingestion mode. For example, the CTF generation control computing platform 102 may determine whether the enriched telematics output should be ingested in a streaming mode or in a batch mode. The CTF generation control computing platform 102 may determine which mode to ingest the enriched telematics output in based on a predetermined setting. For example, a user may specify that ingestion should occur in a batch mode on an hourly basis. In another instance, the CTF generation control computing platform 102 may determine the ingestion mode based on data sources (sensors, devices, driving engines, or the like) used to provide the telematics output and/or third party source output. In yet another instance, the CTF generation control computing platform 102 may determine, via the machine learning datasets, whether to ingest in a streaming mode or in a batch mode. For example, if the CTF generation control computing platform 102 has previously analyzed a particular driving trip more than a predetermined threshold number of times, the CTF generation control computing platform 102 may determine that the enriched telematics output may be ingested in a streaming mode. If the CTF generation control computing platform 102 determines that the particular driving trip has been analyzed less than the predetermined threshold number of times, the CTF generation control computing platform 102 may determine that the enriched telematics output may be ingested in a batch mode. If the CTF generation control computing platform 102 determines that the streaming ingestion mode should be used, the CTF generation control computing platform 102 may proceed to step 220. If the CTF generation control computing platform 102 determines that the batch ingestion mode should be used, the CTF generation control computing platform 102 may proceed to step 219.

At step 219, after determining that batch ingestion should be used, the CTF generation control computing platform 102 may determine a first event. In determining the first event, the CTF generation control computing platform 102 may determine a first driving trip associated with the enriched telematics output. For example, the CTF generation control computing platform 102 may determine that the enriched telematics output comprises data from a driver's trip home from work.

At step 220, if the CTF generation control computing platform 102 determined, at step 218, that batch ingestion should be used, once the first event has been determined at step 219, the CTF generation control computing platform 102 may store the enriched telematics output. For example, the CTF generation control computing platform may store the enriched telematics output along with a machine learning dataset associated with the first event. Following the example described at step 219, the CTF generation control computing platform 102 may store the enriched telematics output along with a machine learning dataset associated with trips between home and work, or more specifically, trips from work to home for the driver. In another example, the machine learning dataset may be associated with the current trip from work to home, but not previous or historic trips.

If, at step 218, the CTF generation control computing platform 102 determined that streaming ingestion should be used, the enriched telematics output may be stored for later processing based on a receipt time of the telematics data comprising the enriched telematics output. For example, if first telematics data and second telematics data are received (comprising a first enriched telematics output and a second enriched telematics output respectively), the first enriched telematics output may be stored for processing prior to the second enriched telematics output.

Referring to FIG. 2F, at step 221, the CTF generation control computing platform 102 may determine that a predetermined time period has expired. If the predetermined time period has expired, the CTF generation control computing platform may proceed to step 222. In other instances, the CTF generation control computing platform may determine that the predetermined time period has not expired. In these instances, the CTF generation control computing platform may return to step 204 to receive additional telematics outputs. In some instances, the CTF generation control computing platform 102 may determine the predetermined time period based on a user input (e.g., user requests a one hour time period). In other instances, the CTF generation control computing platform 102 may determine the predetermined time period based on a trip initiation location and a trip destination.

At step 222, the CTF generation control computing platform 102 may generate a standardized CTF output. For example, in generating the standardized CTF output, the CTF generation control computing platform 102 may generate a JavaScript Object Notation (JSON) spreadsheet comprising the enriched telematics outputs for a particular trip in a standard format. The CTF generation control computing platform 102 may generate an output (e.g., a JSON spreadsheet, or the like) containing variables such as trip starts time, trip end time, braking events, hourly trip updates, speed, points of interest, weather at different parts during the trip, GPS points at a 1 Hz frequency, latitude and longitude components, acceleration events, or the like in a standardized order. In some instances, the CTF generation control computing platform 102 may include user and/or device key fields in the spreadsheet. In some instances, the CTF generation control computing platform 102 may generate the standardized CTF output using a JSON structure.

In some instances, the enriched telematics outputs may be processed based on priority. For example, cost per mile may comprise high priority data. As a result, cost per mile may be determined based on the enriched telematics outputs and added to the standardized CTF output prior to the addition of data determined to be low priority.

At step 223, the CTF generation control computing platform 102 may send the CTF output generated at step 222. For example, the CTF generation control computing platform 102 may establish a fourth wireless data connection with customized driver output generation computing platform 106. The CTF generation control computing platform 102 may send, via the communication interface 113, to the customized driver output generation computing platform 106, and via the fourth wireless data connection, the CTF output.

At step 224, the customized driver output generation computing platform 106 may receive, from the CTF generation control computing platform 102 and via the fourth wireless data connection, the CTF output.

Figure 2G:
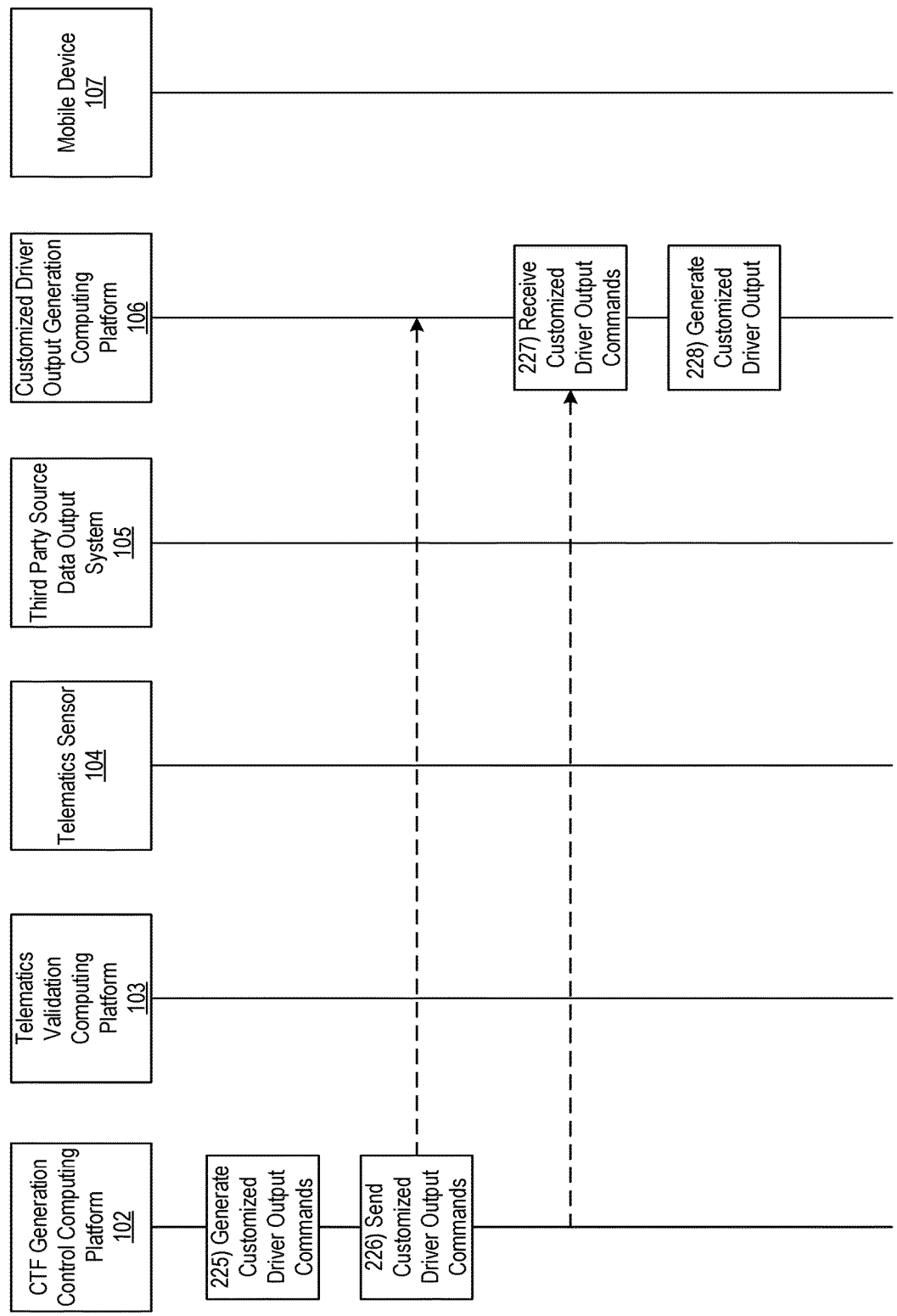

Referring to FIG. 2G, at step 225, The CTF generation control computing platform 102 may generate one or more customized driver output commands. For example, the CTF generation control computing platform 102 may generate one or more commands directing the customized driver output generation computing platform 106 to generate a customized driver output.

At step 226, the CTF generation control computing platform 102 may send the customized driver output commands generated at step 225. For example, the CTF generation control computing platform 102 may send, via the communication interface, via the fourth wireless data connection, and to the customized driver output generation computing platform 106, the customized driver output commands.

At step 227, the customized driver output generation computing platform 106 may receive the customized driver output commands sent at step 226. For example, the customized driver output generation computing platform 106 may receive, from the CTF generation control computing platform 102 and via the fourth wireless data connection, the customized driver output commands.

At step 228, the customized driver output generation computing platform 106 may generate a customized driver output. For example, the customized driver output may be a score assigned to a driver based on a driving history. The customized driver output generation computing platform 106 may generate the customized driver output based on, for example, the CTF output received at step 224. The customized driver output generation platform 106 may also implement machine learning algorithms and datasets in determining the customized driver output. The customized driver output generation platform 106 may refine the machine learning algorithms and datasets via a feedback loop. For example, the customized driver output generation platform 106 may have previously generated a customized driver output indicating a driver is a low risk driver. In this example, if the standardized CTF output includes claims data indicating that the driver is actually a high risk driver, the machine learning datasets may be updated to reflect this assessment and a customized driver output may be generated accordingly.

Figure 2H:
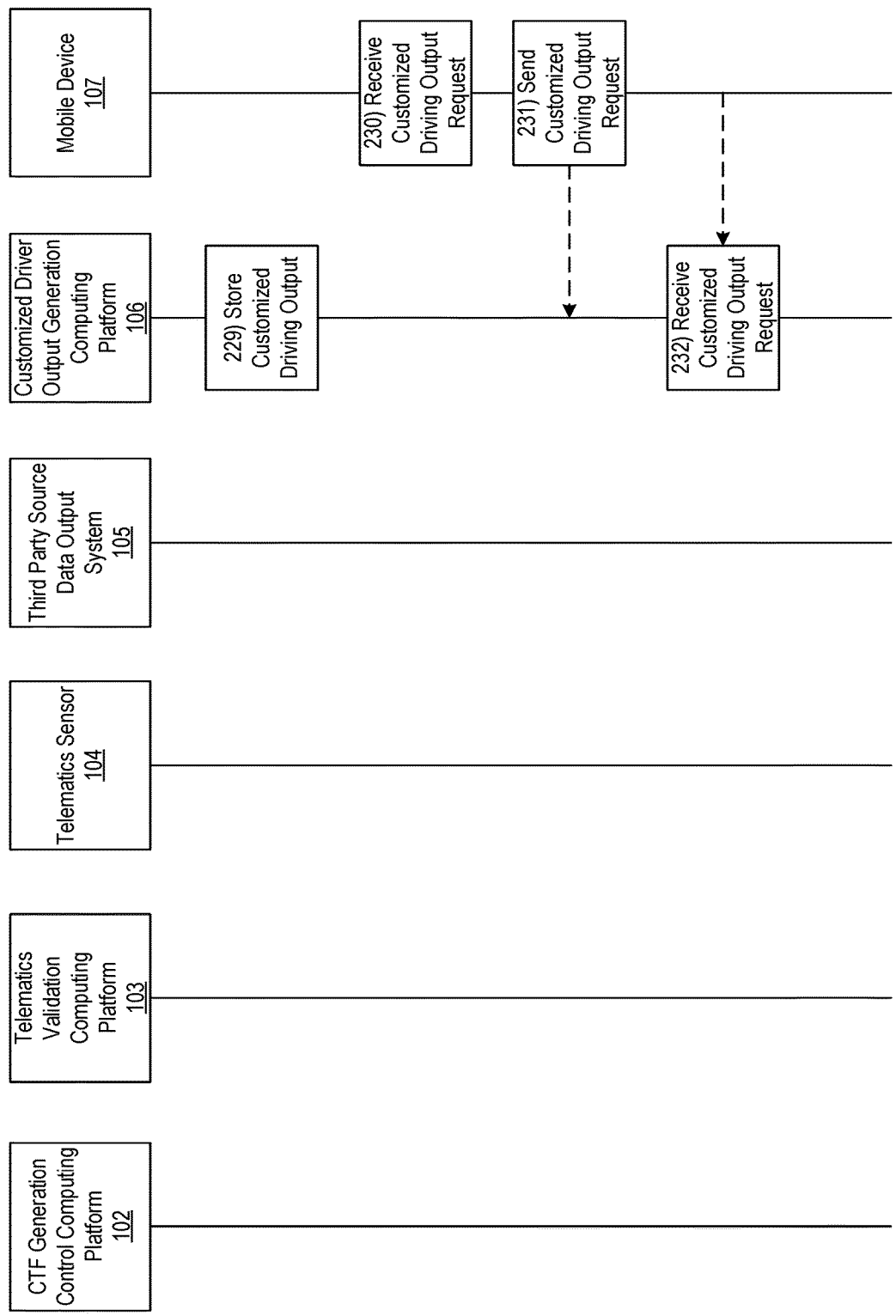
Figure 21:
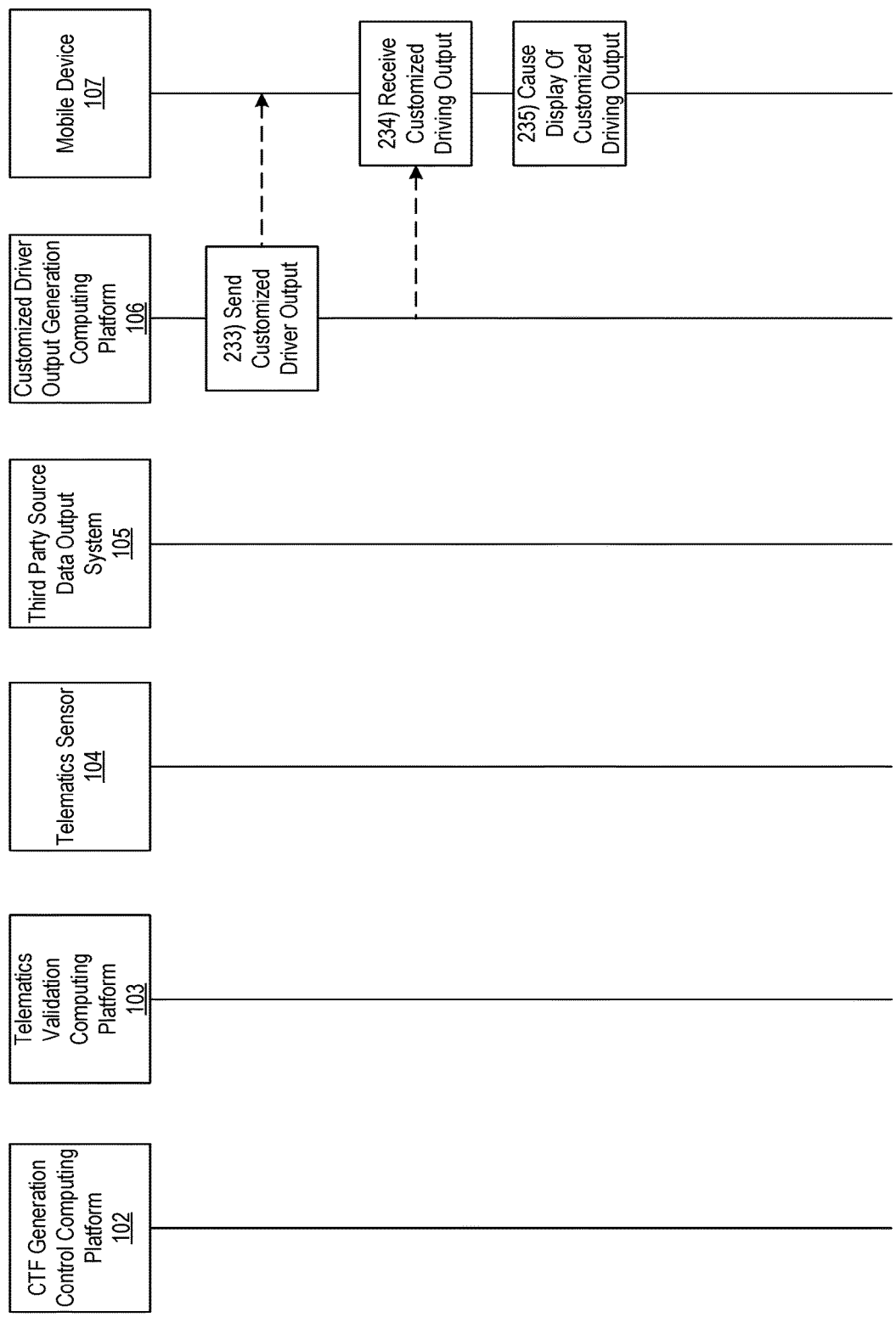

Referring to FIG. 2H, at step 229, the customized driver output generation computing platform 106 may store the customized driver output generated at step 228.

Figure 3:
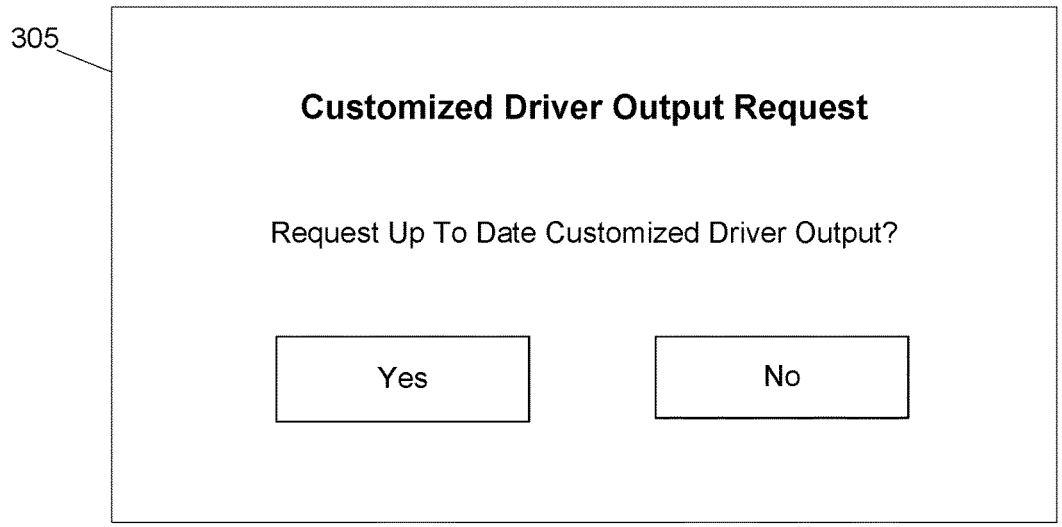
FIGS. 3 and 4 depict example graphical user interfaces for a common trip format (CTF) generation control computing platform that utilizes improved customized driver output generation techniques in accordance with one or more example arrangements discussed herein.

At step 230, the mobile device 107 may cause display of a customized driver output request. For example, via a driver assistance application, the mobile device 107 may display and/or otherwise present a graphical user interface similar to graphical user interface 305, which is illustrated in FIG. 3. The user interface may prompt a user to request an up to date customized driver output, and may receive, in response to the prompt, a customized driving output request input. The mobile device 107 may proceed to step 231 after receiving a customized driving output request input.

At step 231, the mobile device 107 may send the customized driving output request input to the customized driver output generation computing platform 106. The mobile device 107 may establish a connection with customized driver output generation computing platform 106. For example, the mobile device 107 may establish a fifth wireless data connection with the customized driver output generation computing platform 106. The mobile device 107 may send, via the fifth wireless data connection and to the customized driver output generation computing platform 106, the customized driving output request input.

At step 232, the customized driver output generation computing platform 106 may receive the customized driving output request input. For example, the customized driver output generation computing platform 106 may receive, via the fifth wireless data connection and from the mobile device 107, the customized driving output request input.

Referring to FIG. 2I, at step 233, customized driver output generation computing platform 106 may send, to the mobile device 107 and via the fifth wireless data connection, the customized driver output generated at step 228. For example, the customized driver output generation computing platform 106 may send the customized driver output along with user interface templates, user interface layouts, user interface content data, and/or other information At step 234, the mobile device 107 may receive, from the customized driver output generation computing platform 106 and via the fifth wireless data connection, the customized driving output.

Figure 4:
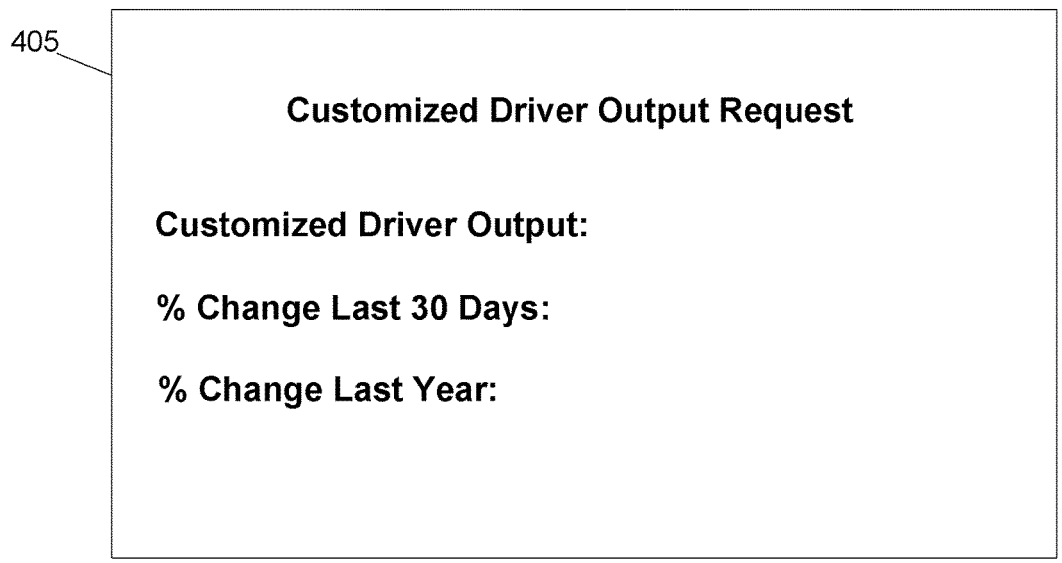

At step 235, the mobile device 107 may cause display of the customized driving output. For example, the mobile device 107 may display and/or otherwise present a graphical user interface (e.g., based on the information received from the customized driver output generation computing platform 106) similar to graphical user interface 405, which is illustrated in FIG. 4. For example, the mobile device 107 may cause display of the customized driver output and other additional information associated with the output such as how the customized driver output compares to others or has recently changed. In causing display of the customized driver output, the mobile device 107 may cause display of a numeric value (90/100 or the like) or a description ("Excellent," "Moderate," "Poor," or the like) comprising an indication of driver safety.

Figure 5:
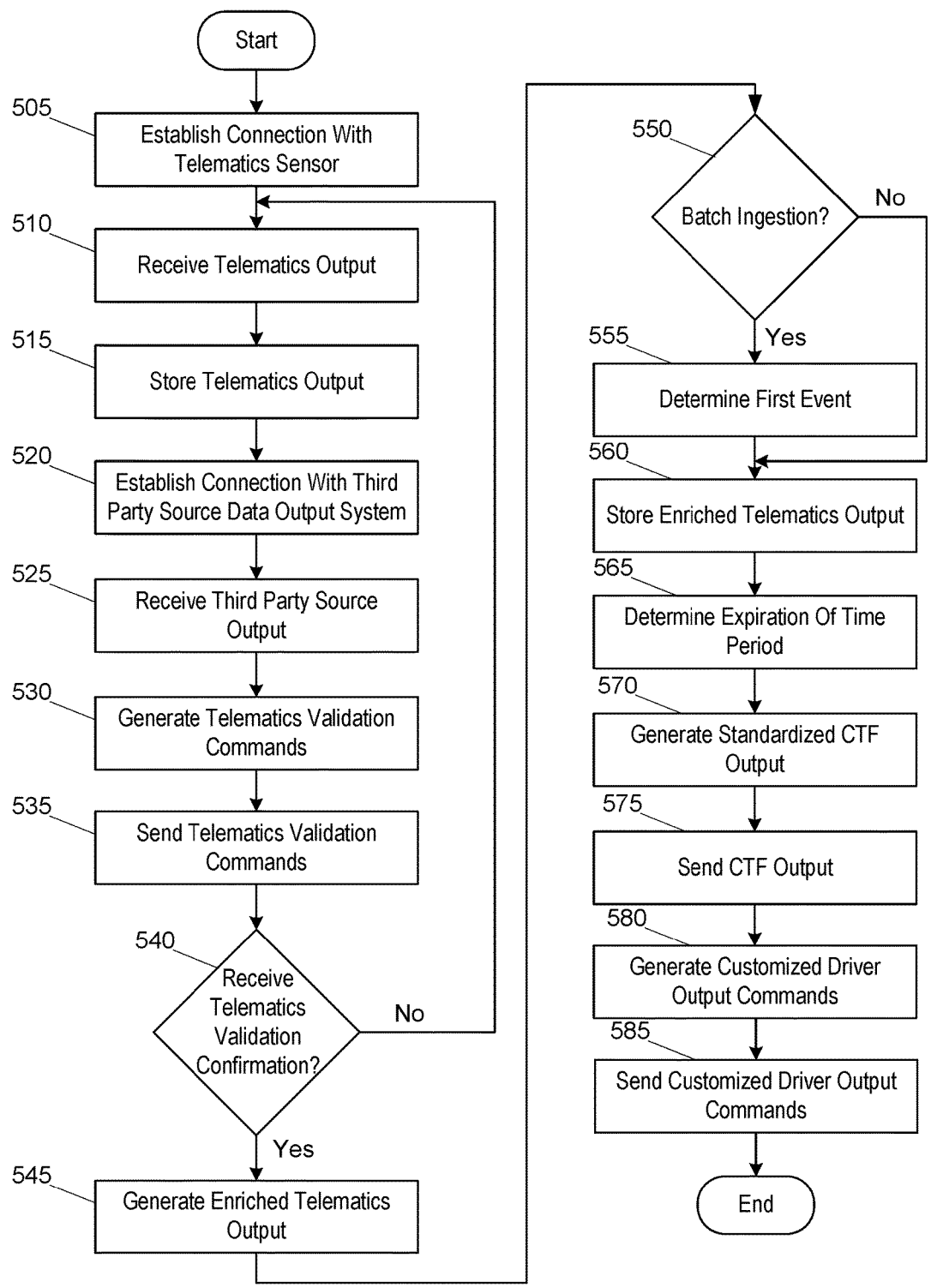
FIG. 5 depicts an illustrative method for deploying a common trip format (CTF) generation control computing platform that utilizes improved customized driver output generation techniques in accordance with one or more example arrangements discussed herein.

Subsequently, the example event sequence may end, and CTF generation control computing platform 102 may continue to generate standardized CTF outputs in a similar manner as discussed above (e.g., by enriching telematics outputs associated with a driving trip with third party source data also associated with the driving trip, validating the enriched telematics outputs, and ingesting the enriched telematics output using either a streaming or batch ingestion process). By operating in this way, CTF generation control computing platform 102 may standardize source data from multiple devices to facilitate processing of the data via machine learning analysis and datasets to generate customized driver outputs FIG. 5 depicts an illustrative method for deploying a common trip format CTF generation control computing platform that utilizes improved customized driver output generation in accordance with one or more example embodiments. Referring to FIG. 5, at step 505, a computing platform having at least one processor, a communication interface, and memory may establish a connection with one or more telematics sensors. At step 510, the computing platform may receive, from the one or more telematics sensors, a telematics output. At step 515, the computing platform may store the telematics output. At step 520, the computing platform may establish a connection with one or more third party source data output systems. At step 525 the computing platform may receive, from the third party source data output systems, third party source outputs. At step 530, the computing platform may generate one or more telematics validation commands directing a telematics validation computing platform to validate the telematics output. At step 535, the computing platform may send, to the telematics validation computing platform, the one or more telematics validation commands.

At 540 the computing platform may determine whether a telematics validation confirmation was received. If a telematics validation confirmation was not received, the computing platform may return to step 510. If a telematics validation confirmation was received, the computing platform may proceed to step 545. At step 545, based on the telematics output and the third party source output, the computing platform may generate an enriched telematics output.

After generating the enriched telematics output, the computing platform may determine, at step 550, whether to perform batch ingestion. If so, the computing device may proceed to step 555. If not, the computing device may proceed to step 560. At step 555, the computing platform may determine a first event associated with the enriched telematics output. At step 560, the computing platform may store the enriched telematics output. At step 565, the computing platform may determine that a predetermined time period has expired. At step 570, the computing platform may generate a standardized CTF output, such as a JSON spreadsheet, based on one or more enriched telematics outputs. At step 575, the computing platform may send the CTF output to a customized driver output generation computing platform. After sending the CTF output, at step 580, the computing platform may generate one or more customized driver output commands directing the customized driver output generation computing platform to generate a customized driver output. At step 585, after generating the one or more customized driver output commands, the computing platform may send the one or more customized driver output commands to the customized driver output generation computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        receive, from a plurality of telematics sensors and via the communication interface, telematics output data;
        receive, from a plurality of third party sources and via the communication interface, third party source data;
        generate an enriched telematics output by combining the telematics output data and the third party source data;
        determine whether the enriched telematics output should be ingested in a streaming mode or a batch mode;
        in response to determining that the enriched telematics output should be ingested in the batch mode:
            determine that the enriched telematics output is associated with a first event,
            store, for a predetermined period of time, the enriched telematics output along with a machine learning dataset associated with the first event, and
            in response to an expiration of the predetermined period of time, generate, based on enriched telematics outputs, including the enriched telematics output, stored along with the machine learning dataset associated with the first event, a standardized common trip format (CTF) output, wherein the standardized CTF output comprises a JavaScript Object Notation (JSON) spreadsheet comprising the enriched telematics outputs in a uniform format; and
        send, to a customized driver output generation computing platform, the standardized CTF output and one or more commands directing the customized driver output generation computing platform to generate a customized driver output based on the standardized CTF output, wherein the customized driving output is configured for display and includes a description of driver safety.

2. The computing platform of claim 1, wherein the memory further stores computer-readable instructions that, when executed by the at least one processor, cause the computing platform to:
    generate one or more commands directing a telematics output validation computing platform to validate the enriched telematics output;
    transmit, to the telematics output validation computing platform and via the communication interface, the one or more commands directing the telematics output validation computing platform to validate the enriched telematics output; and
    receive, from the telematics output validation computing platform and via the communication interface, an enriched telematics output confirmation comprising an indication that the enriched telematics output has been validated.

3. The computing platform of claim 2, wherein validating the enriched telematics output comprises receiving the enriched telematics output confirmation.

4. The computing platform of claim 1, wherein the memory further stores computer-readable instructions that, when executed by the at least one processor, cause the computing platform to:
    establish a first connection between the computing platform and the plurality of telematics sensors, wherein the telematics output data is received while the first connection is established; and
    establish a second connection between the computing platform and the plurality of third party sources, wherein the third party source data is received while the second connection is established.

5. The computing platform of claim 1, wherein the first event comprises one of a first driving trip or an initial occurrence of an event within the first driving trip.

6. The computing platform of claim 1, wherein the memory further stores computer-readable instructions that, when executed by the at least one processor, cause the computing platform to:
    determine that the enriched telematics output corresponds to a higher priority than another enriched telematics output; and
    process, prior to processing the another enriched telematics output, the enriched telematics output.

7. The computing platform of claim 1, wherein the memory further stores computer-readable instructions that, when executed by the at least one processor, cause the computing platform to:
    in response to determining that the enriched telematics output should be ingested in the streaming mode, generate, based on the enriched telematics output, the standardized CTF output.

8. The computing platform of claim 1, wherein the customized driver output is one or more of: a driving score or a driving performance description.

9. The computing platform of claim 1, wherein the standardized CTF output includes a user identifier.

10. The computing platform of claim 1, wherein the memory further stores computer-readable instructions that, when executed by the at least one processor, cause the computing platform to:
receive, from the plurality of telematics sensors and via the communication interface, second telematics output data;
generate a second enriched telematics output by combining the second telematics output data and the third party source data;
determine that the second enriched telematics output was not validated; and
determine that the second enriched telematics output should not be ingested.

11. A computing platform comprising:
at least one processor;
a communication interface communicatively coupled to the at least one processor; and
memory storing computer-readable instructions that, when executed by the at least one processor, cause the computing platform to:
determine that an enriched telematics output should be ingested in a batch mode; and
in response to determining that the enriched telematics output should be ingested in the batch mode:
determine that the enriched telematics output is associated with a first event,
store, for a predetermined period of time, the enriched telematics output along with a machine learning dataset associated with the first event, and
in response to an expiration of the predetermined period of time, generate, based on enriched telematics outputs, including the enriched telematics output, stored along with the machine learning dataset associated with the first event, a standardized common trip format (CTF) output, wherein the standardized CTF output comprises a JavaScript Object Notation (JSON) spreadsheet comprising the enriched telematics outputs in a uniform format; and
send, to a customized driver output generation computing platform, the standardized CTF output and one or more commands directing the customized driver output generation computing platform to generate a customized driver output based on the standardized CTF output, wherein the customized driving output is configured for display and includes a description of driver safety.

12. The computing platform of claim 11, wherein the memory further stores computer-readable instructions that, when executed by the at least one processor, cause the computing platform to:
generate one or more commands directing the telematics validation computing platform to validate the enriched telematics output; and
transmit, to the telematics validation computing platform and via the communication interface, the one or more commands directing the telematics validation computing platform to validate the enriched telematics output.

13. The computing platform of claim 12, wherein the memory further stores computer-readable instructions that, when executed by the at least one processor, cause the computing platform to:
generate the one or more commands directing the customized driver output generation computing platform to generate the customized driver output, wherein the one or more commands directing the customized driver output generation computing platform cause the customized driver output generation computing platform to determine a driving score based on the standardized CTF output.

14. The computing platform of claim 13, wherein the telematics validation computing platform and the customized driver output generation computing platform are integrated into the computing platform.

15. The computing platform of claim 11, wherein the predetermined period of time is configured by a user.

16. The computing platform of claim 11, wherein the memory further stores computer-readable instructions that, when executed by the at least one processor, cause the computing platform to:
determine a trip initiation location and a trip destination; and
determine, based on the trip initiation location and the trip destination, the predetermined period of time.

17. The computing platform of claim 11, wherein the memory further stores computer-readable instructions that, when executed by the at least one processor, cause the computing platform to:
determine, based on a predefined setting, that the enriched telematics output should be ingested in the batch mode, wherein the predefined setting is configurable by a user.

* * * * *

UNITED STATES PATENT AND TRADEMARK OFFICE
CERTIFICATE OF CORRECTION

PATENT NO. : 10,533,867 B2
APPLICATION NO. : 16/162666
DATED : January 14, 2020
INVENTOR(S) : Zoran Navratil et al.

Page 1 of 1

It is certified that error appears in the above-identified patent and that said Letters Patent is hereby corrected as shown below:

In the Claims

At Column 20, Claim number 12, Line number 7, please delete "the" and replace with -- a --

Signed and Sealed this
Eighteenth Day of February, 2020

Andrei Iancu
*Director of the United States Patent and Trademark Office*